(12) United States Patent
Bikumala et al.

(10) Patent No.: US 11,443,122 B2
(45) Date of Patent: Sep. 13, 2022

(54) IMAGE ANALYSIS-BASED ADAPTATION TECHNIQUES FOR LOCALIZATION OF CONTENT PRESENTATION

(71) Applicant: Dell Products L.P., Round Rock, TX (US)

(72) Inventors: Sathish Kumar Bikumala, Round Rock, TX (US); Parminder Singh Sethi, Ludhiana (IN)

(73) Assignee: Dell Products L.P., Round Rock, TX (US)

( * ) Notice: Subject to any disclaimer, the term of this patent is extended or adjusted under 35 U.S.C. 154(b) by 183 days.

(21) Appl. No.: 16/807,899

(22) Filed: Mar. 3, 2020

(65) Prior Publication Data

US 2021/0279430 A1     Sep. 9, 2021

(51) Int. Cl.
*G06F 40/58* (2020.01)
*G06F 40/30* (2020.01)
*G06K 9/62* (2022.01)

(52) U.S. Cl.
CPC .............. *G06F 40/58* (2020.01); *G06F 40/30* (2020.01); *G06K 9/6215* (2013.01)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS

| | | | |
|---|---|---|---|
| 7,721,303 B2 * | 5/2010 | Alves de Moura | G06F 8/38 709/202 |
| 8,515,731 B1 * | 8/2013 | Ramirez Robredo | G06F 40/51 704/2 |
| 8,613,039 B2 | 12/2013 | Chen et al. | |
| 8,761,513 B1 * | 6/2014 | Rogowski | G06F 40/51 382/187 |
| 9,104,661 B1 * | 8/2015 | Evans | H04N 21/2343 |
| 9,262,407 B1 * | 2/2016 | Ermann | G06F 40/40 |
| 10,275,266 B1 * | 4/2019 | Bhavineni | G06F 40/58 |
| 10,373,191 B2 * | 8/2019 | Shinohara | G06F 40/109 |
| 2002/0091509 A1 | 7/2002 | Zoarez et al. | |
| 2002/0186241 A1 | 12/2002 | Kohda et al. | |

(Continued)

OTHER PUBLICATIONS

Wikipedia, "Natural Language Processing," https://en.wikipedia.org/wiki/Natural_language_processing, Feb. 26, 2020, 9 pages.

(Continued)

*Primary Examiner* — Lamont M Spooner
(74) *Attorney, Agent, or Firm* — Ryan, Mason & Lewis, LLP

(57) ABSTRACT

Techniques for localization of a content presentation in an information processing system are provided. In one example, a method adapts translated content to accommodate an original content design structure (e.g., wireframe) when such translated content is inconsistent with the original content design structure. In another example, a method adapts the original content design structure when translated content is inconsistent with the original content design structure. In yet another example, an image analysis method is used to adapt translated content determined to be inconsistent with the original content design structure.

20 Claims, 8 Drawing Sheets

(56) References Cited

U.S. PATENT DOCUMENTS

| | | | |
|---|---|---|---|
| 2003/0046062 A1* | 3/2003 | Cartus | G06F 40/166 704/10 |
| 2006/0248071 A1* | 11/2006 | Campbell | G06F 40/103 707/999.005 |
| 2006/0265652 A1* | 11/2006 | Seitz | G06F 40/58 715/764 |
| 2008/0249992 A1* | 10/2008 | Goedecke | G06F 16/3337 |
| 2009/0055159 A1* | 2/2009 | Kato | G06F 40/40 704/3 |
| 2009/0327866 A1* | 12/2009 | Li | G06F 40/117 715/234 |
| 2010/0017382 A1* | 1/2010 | Katragadda | G06F 16/90332 707/E17.074 |
| 2012/0016865 A1* | 1/2012 | Travieso | G06F 40/103 707/711 |
| 2012/0017146 A1* | 1/2012 | Travieso | G06F 40/45 715/265 |
| 2012/0059644 A1* | 3/2012 | Sata | G06F 40/58 704/3 |
| 2012/0162266 A1 | 6/2012 | Douglas et al. | |
| 2013/0006603 A1* | 1/2013 | Zavatone | G06F 40/58 704/2 |
| 2013/0132825 A1* | 5/2013 | Masuko | G06F 40/58 715/236 |
| 2013/0275118 A1* | 10/2013 | DeNero | G06F 40/45 704/3 |
| 2014/0297256 A1* | 10/2014 | Rogowski | G06K 9/00 704/2 |
| 2018/0095950 A1 | 4/2018 | Phadke | |
| 2018/0225285 A1* | 8/2018 | Anglin | G06F 40/263 |
| 2018/0300218 A1* | 10/2018 | Lipka | G06F 40/40 |
| 2018/0300318 A1* | 10/2018 | Sittel | G06F 40/58 |
| 2018/0307683 A1* | 10/2018 | Lipka | G06F 9/454 |
| 2018/0329801 A1 | 11/2018 | McKee et al. | |
| 2019/0065019 A1* | 2/2019 | Lehtomäki | G06F 40/58 |
| 2019/0065485 A1* | 2/2019 | Hayashi | G06F 13/00 |
| 2019/0228058 A1* | 7/2019 | Shang | G06F 16/986 |
| 2019/0266432 A1* | 8/2019 | Lee | G06V 10/17 |
| 2019/0340248 A1* | 11/2019 | Travieso | G06F 40/44 |
| 2020/0019583 A1* | 1/2020 | Halfond | G06F 40/109 |
| 2020/0064977 A1* | 2/2020 | Wu | G06F 9/451 |
| 2020/0110836 A1* | 4/2020 | Kumbhar | G06F 40/51 |
| 2020/0401425 A1* | 12/2020 | Wang | G06F 9/454 |
| 2021/0224491 A1* | 7/2021 | Kim | G06N 3/04 |

OTHER PUBLICATIONS

Wikipedia, "Website Wireframe," https://en.wikipedia.org/wiki/Website_wireframe, Feb. 17, 2020, 4 pages.

Wikipedia, "Website Localization," https://en.wikipedia.org/wiki/Website_localization, Mar. 1, 2020, 4 pages.

U.S. Appl. No. 16/807,838 filed in the name of Parminder Singh Sethi et al. filed Mar. 3, 2020, and entitled "Content Adaptation Techniques for Localization of Content Presentation."

U.S. Appl. No. 16/807,862 filed in the name of Sathish Kumar Bikumala et al. filed Mar. 3, 2020, and entitled "Content Design Structure Adaptation Techniques for Localization of Content Presentation."

* cited by examiner

Cr◆er un compte administrateur

You'll use this admin account to log in for future visits.

Remarque : Pour des raisons de s◆curit◆, le nom d◆utilisateur et le mot de passe adminstrateur doivent ◆tre uniques et g◆r◆s s◆par◆ment des informations du compte racine du syst◆me Exigences ◆respecter pour le mot de passe

- 8-16 characters
- at least one uppercase letter
- at least one lowercase letter
- at least one number
- at least one special character (` ~ ! @ # $ % ^ & * ( ) - _ = + [ ] { } ; < >)
- use a password that does not match the current password Truncation issue:- Highlighted text is appearing truncated.

Nom d'utilisateur * admin

Mot de passe *

Confirmer le nouveau mot de passe *

Se connecter en tant qu◆ administrateu

IMAGE ANALYSIS-BASED ADAPTATION TECHNIQUES FOR LOCALIZATION OF CONTENT PRESENTATION

FIELD

The field relates generally to information processing systems, and more particularly to techniques for localization of content presentations in such information processing systems.

BACKGROUND

Content localization is typically considered the process of adapting an existing content presentation to a local language and, if possible, culture in a target market. By way of example, website localization adapts one or more web pages of an existing website to the local language and culture in a specific target market. Localization can involve more than the translation of text. Localization can reflect specific language and cultural preferences in images, overall design and requirements of the website, all while maintaining the integrity of the website.

A culturally adapted website will make navigation easier for the users, and thus their attitude towards the site will be much more positive. Furthermore, a main purpose of localization is to customize a website in a way that seems natural to its viewers, despite certain cultural differences between the creator and the audience. As people speak different languages, worldwide website localization has become one of the primary tools for global business expansion. It is clear that linguistic and cultural knowledge is essential for this purpose, but programming expertise is also necessary.

SUMMARY

Embodiments of the invention provide techniques for localization of a content presentation in an information processing system. For example, in one illustrative embodiment, a method adapts translated content to accommodate an original content design structure (e.g., wireframe) when such translated content is inconsistent with the original content design structure. In another illustrative embodiment, a method adapts the original content design structure when translated content is inconsistent with the original content design structure. In yet another illustrative embodiment, an image analysis method is used to adapt translated content determined to be inconsistent with the original content design structure.

Advantageously, illustrative embodiments provide, inter alia, a consistent user experience in all global languages, a reduced cost of testing pages, and accelerated web development due to reduction of multiple design updates to the wireframes.

These and other features and advantages of the invention will become more readily apparent from the accompanying drawings and the following detailed description.

BRIEF DESCRIPTION OF THE DRAWINGS

FIG. 1 depicts an example of a content design structure with which one or more illustrative embodiments can be implemented.

FIG. 2 depicts an example of truncated content after content translation of a webpage.

FIG. 3 depicts an example of misaligned content after content translation of a webpage.

DETAILED DESCRIPTION

Figure 4:
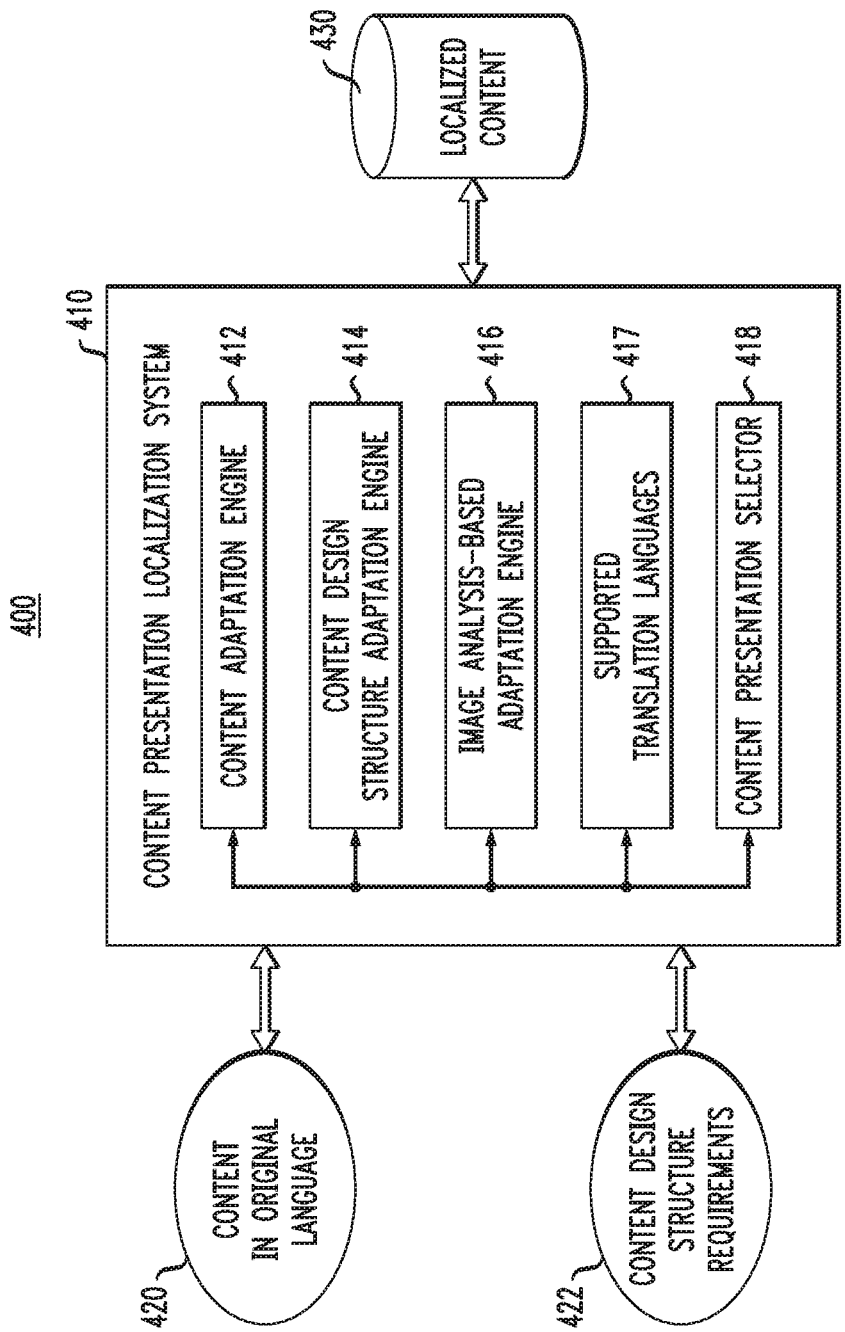
FIG. 4 depicts an information processing system with content presentation localization, according to an illustrative embodiment.

Illustrative embodiments will be described herein with reference to exemplary information processing systems and associated host devices, storage devices and other processing devices. It is to be appreciated, however, that embodiments are not necessarily restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual computing resources. An information processing system may therefore comprise, for example, a cloud infrastructure hosting multiple tenants that share cloud computing resources. Such systems are considered examples of what are more generally referred to herein as cloud computing environments.

Furthermore, some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or a computing system. On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services on private clouds, public clouds, and/or a combination of private and public clouds (hybrid cloud computing environment). A computing environment that comprises multiple cloud platforms (private clouds, public clouds, or a combination thereof) is referred to as a "multi-cloud computing environment."

Still further, an information processing system may comprise non-cloud infrastructure, or a combination of non-cloud and cloud infrastructures. Moreover, phrases such as "computing environment," "cloud environment," "cloud computing platform," "cloud infrastructure," "data repository," "data center," "data processing system," "computing system," "data storage system," "information processing system," and the like, as used herein, are intended to be broadly construed, so as to encompass, for example, any arrangement of one or more processing devices.

While examples of content presentations described herein focus on webpages, it is to be appreciated that embodiments are intended to apply to localization of any suitable electronic content presentations including, but not limited to, presentation of data pages, data files, data templates, data objects, articles, billboards, and the like.

Furthermore, illustrative embodiments realize that the importance of design plays a critical role in localizing any website because a flexible design enables pages to scale based on dynamic content. Compared to English for instance, some languages have words that are significantly longer or significantly shorter. For instance, most of the Asian languages contain words that could be less than half the source language width. Illustrative embodiments provide techniques for content presentation localization that account for these and other challenges.

Prior to describing illustrative embodiments, the concept of wireframing of web pages is briefly described along with some drawbacks associated with existing webpage content localization techniques.

Figure 1:
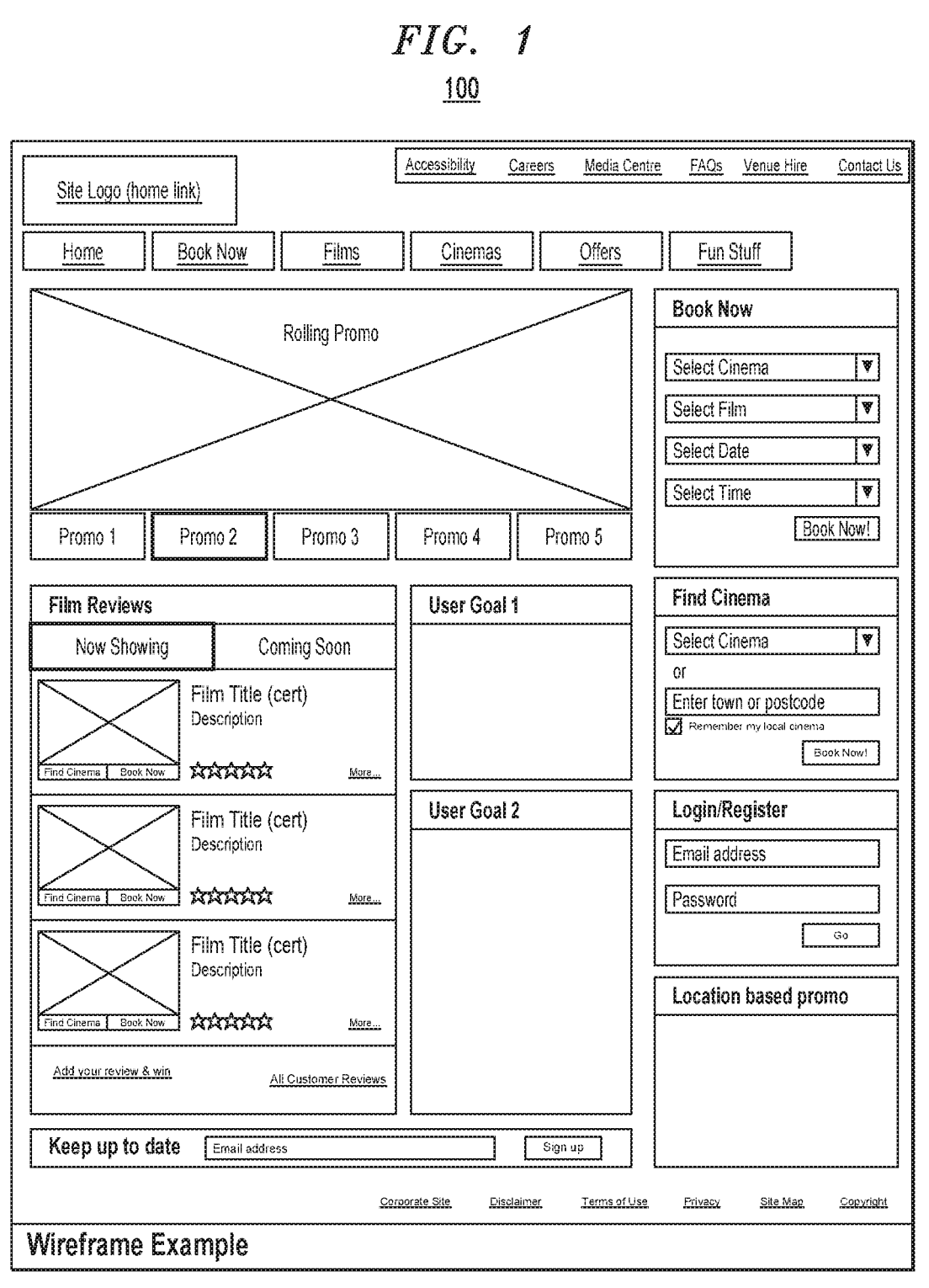

Referring initially to FIG. 1, an example of a wireframe 100 associated with a webpage design is shown. Wireframing is a way to design a website at the structural level. A wireframe is commonly used to lay out content and functionality on a page which takes into account, for example, user needs and user goals. Wireframes are used early in the development process to establish the basic structure of a page before visual design and content is added. One of the great advantages of wireframing is that it provides an early visual that can be used to review with the client. Users can also review it as an early feedback mechanism for prototype usability tests. Not only are wireframes easier to amend than concept designs, once approved by the client and the users they provide confidence to the designer. However, when content is added, it might initially be too much to fit within the wireframe layout, so the designer and copywriter will need to work closely to make this fit.

Figure 3:
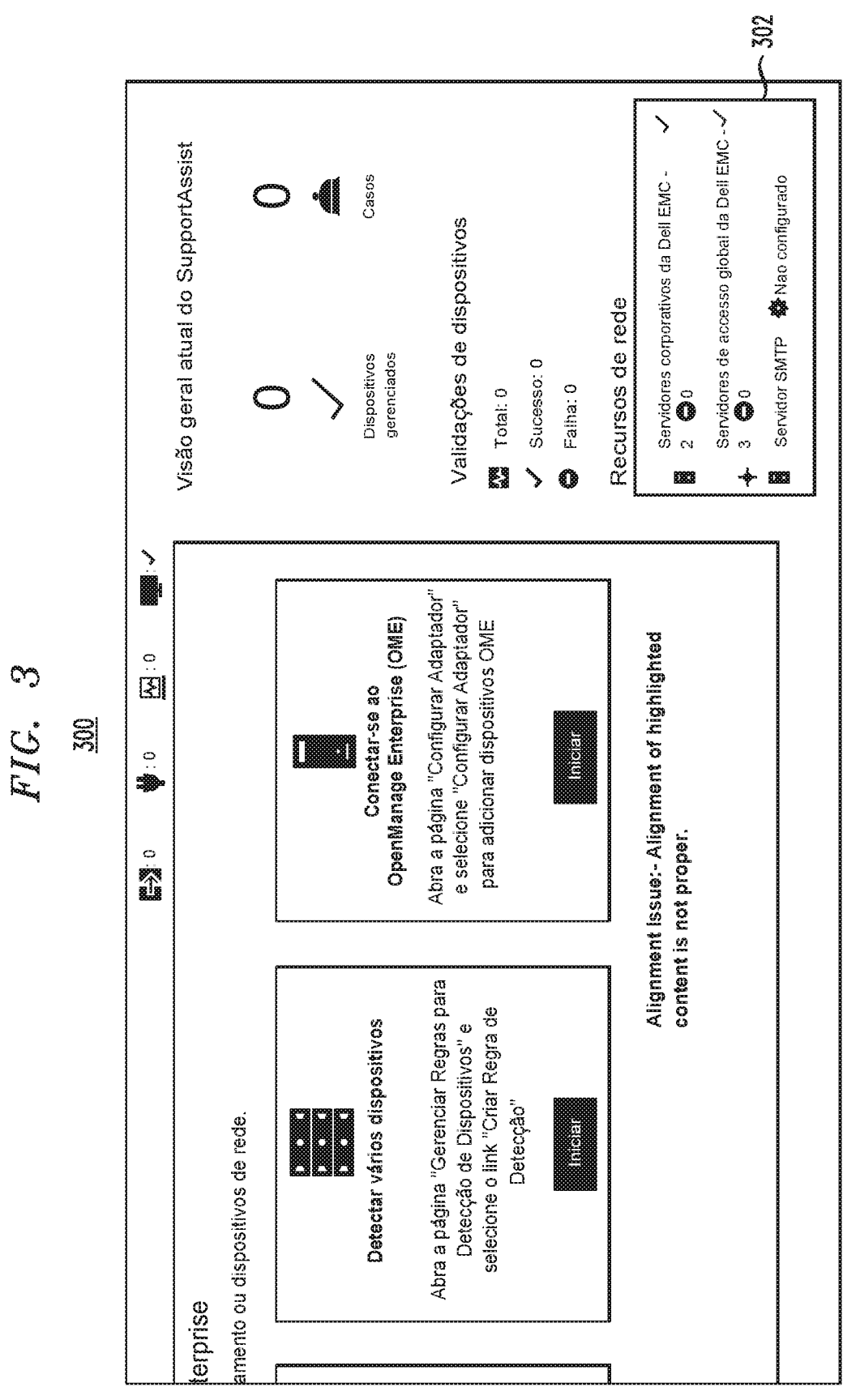

When a page is not localized with factoring design limitations and requirements, the page when translated into a different language shows broken text such as in the example webpage 200 in FIG. 2. More particularly, as highlighted by box 202 in FIG. 2, the translated text appears truncated. FIG. 3 is another example webpage 300 where the wireframe alignment is broken when an English site is translated into Portuguese. More particularly, as highlighted by box 302 in FIG. 3, the alignment of the translated text is not proper.

Maintaining design flexibility is a challenging task as it requires testing in different languages and readjusting multiple times. One or more illustrative embodiments provide techniques to reframe wireframes, or more generally, content design structures, that support any language by enabling an automatic choice of flexible linguistic options while maintaining the original user accepted wireframes. In alternative embodiments, the translated content is not adapted but rather the original wireframe is adapted in an optimal way to accommodate the translated content.

FIG. 4 depicts an information processing system 400 with content presentation localization, according to an illustrative embodiment. As shown, content presentation localization system 410 comprises a set of processing engines that provide various localization features with respect to a content design structure such as, but not limited to, a wireframe. More particularly, content presentation localization system 410 comprises a content adaptation engine 412, a content design structure adaptation engine 414, an image analysis-based adaptation engine 416, supported translation languages 417 and a content presentation selector 418 operatively coupled to one another. It is to be appreciated that each of engines 412, 414 and 416 can provide a stand-alone localization feature for a user. However, two or more of the localization features can be combined to provide further advantages. As shown, various inputs are provided to the content presentation localization system 410 depending on the particular processing engine (412, 414, 416), e.g., content in original language 420 and content design structure requirements 422. The output of the content presentation localization system 410 is localized content 430, i.e., content 420 is adapting to a local language and culture in a target market to yield localized content 430. That is, based on analysis output and/or recommendation(s) generated by one or more of content adaptation engine 412, content design structure adaptation engine 414 and image analysis-based adaptation engine 416, content presentation selector 418 selects the localized content 430, i.e., the content 420 adapted to a local language (of the supported translation languages 417) and culture within a wireframe structure that eliminates or at least minimizes presentation issues such as, but not limited to, truncation (e.g., recall FIG. 2) and misalignment (e.g., recall FIG. 3). In other words, selector 418 is configured to select which adapted presentation from the multiple engines is presented as the localized content 430. The criteria for selection may be predetermined by a content manager and/or automatically determined by an artificial intelligence (AI)/machine learning (ML) system. Alternatively, in embodiments where system 410 is configured with just one of engine 412, 414 or 416, selector 418 is not needed. Localized content, in illustrative embodiments, may be in the form of one or more web pages. Thus, in illustrative embodiments, a web page can be considered content added to a wireframe. The supported translation languages 417 may be one or more languages predetermined by operators of the system 410. System 410 can be updated with different translation languages as the need/desire arises.

As will be further explained in detail below in the context of FIG. 5, content adaptation engine 412 inputs content design structure (e.g., wireframe) requirements 422 and the content in the original language 420, and finds the best matching translated content for the supported languages 417 that is consistent with the original content design structure requirements 422, i.e., that does not exhibit presentation issues such as, but not limited to, truncation and misalignment.

More particularly, engine 412 is configured to convert original content to each destination language and then identify alternative words/sentences (text having the same or similar meaning) within the translated destination language to replace initially-translated words/sentences in the translated destination language that cause a presentation problem for the original wireframe. For example, assume that the original content is in English and the destination language is French. After the original content is translated to French, assume there is one or more truncation/misalignment problems with the wireframe with the initial French translation. Thus, engine 412 identifies alternative French words/sentences that avoid the truncation/misalignment issues. It is to be appreciated that system 410 is not limited to any particular original language or any set of destination languages mentioned in examples herein. In one or more illustrative embodiments, the languages are decided by one or more content managers driven by their user/reader base.

Additionally or alternatively, in one illustrative embodiment, engine 412 can be configured to convert original content to every language supported by the system (or some predetermined subset) and then identify the translated language that best fits the original wireframe (e.g., translated words/sentences that best fit into the space limitations allotted by the original wireframe). For example, assume that the original content is in English and that the system 410 supports French and Arabic as translated destination languages. After the original content is translated to both French and Arabic, assume there is one or more truncation/misalignment problems with the wireframe with the French translation but not the Arabic translation. Thus, engine 412 identifies Arabic as the best language for that given original wireframe design. That is, it can be useful to know for future web page development in Arabic that one particular wireframe design is more accommodating to that language than other wireframe designs.

Figure 5:
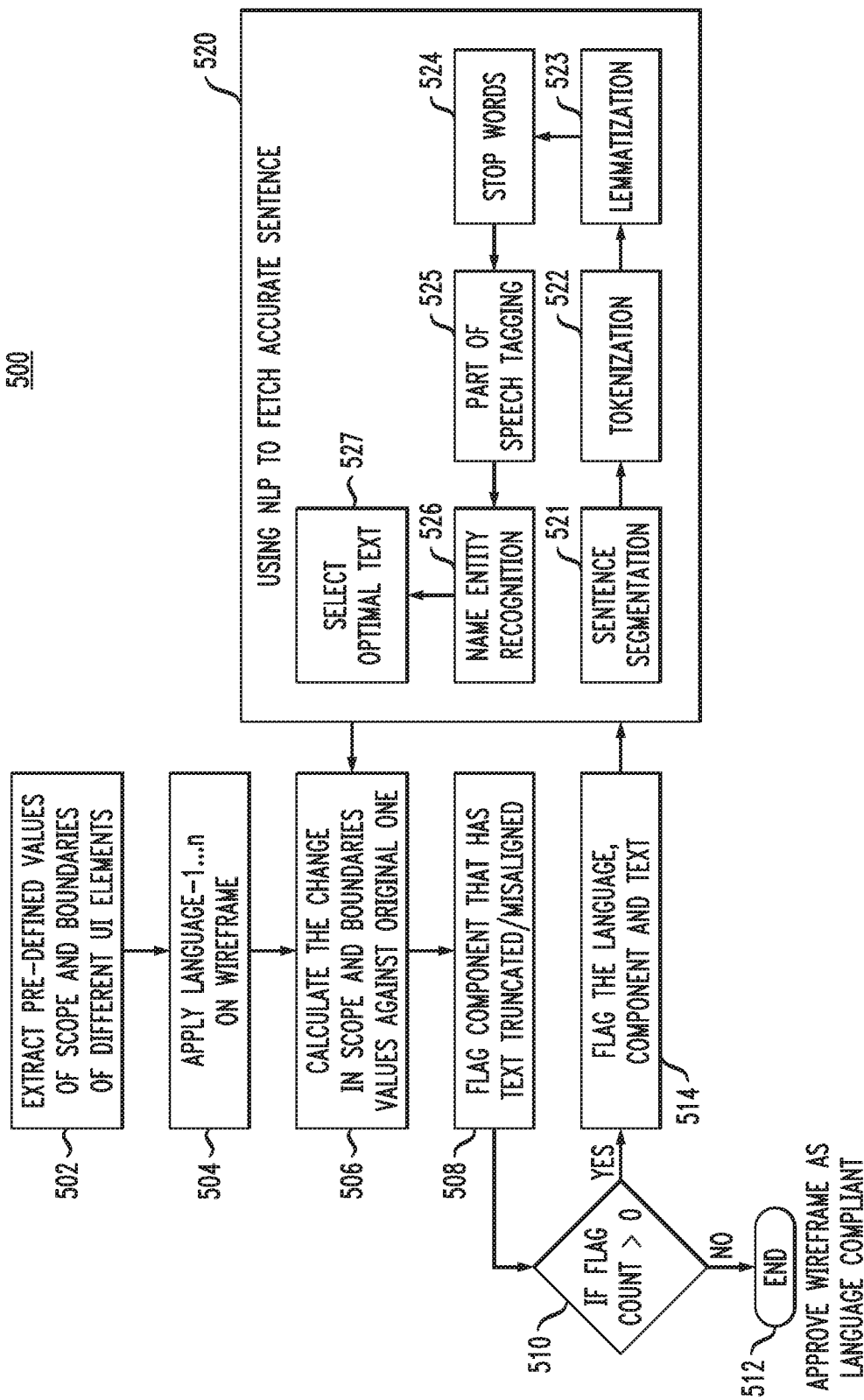
FIG. 5 depicts a content adaptation methodology for content presentation localization, according to an illustrative embodiment.

More particularly, FIG. 5 depicts an illustrative embodiment of a methodology 500 executed by content adaptation engine 412. As shown in methodology 500, step 502 extracts pre-defined values of scope and boundaries of different user interface (UI) elements of a given original wireframe design. Examples of such scope and boundaries values may include, but are not limited to, width and height dimensions of a text box in the original wireframe, width and height dimensions of a drop-down menu, etc. These values are part of the requirements 422 input to system 410 (see FIG. 4). Step 504 applies the one or more supported languages (1 . . . n) on the wireframe. For example, the content adaptation engine 412 translates the original content in the source language using machine translation to the one or more supported languages. Step 506 calculates the change in the scope and boundaries values for each set of translated content against the scope and boundaries values for each corresponding set of original content. For example, recall that in the UI feature in FIG. 2 highlighted as 202, the text translated into Portuguese would necessitate a change to the dimensions (scope and boundaries values) of the original UI feature defined for the source language. Step 508 then flags (e.g., marks or otherwise identifies) each component (UI feature) that has a truncation/misalignment issue following translation. For example, in accordance with one or more illustrative embodiments, when there is a difference that causes such truncation/misalignment, it is said that the UI feature or component is out of scope. Step 510 checks for any flagged components and if there are none, then methodology 500 ends (512). More particularly, this means that after translation, none of the translated content in the UI features of interest has a truncation/misalignment issue and, as such, each wireframe translated into a supported language is approved by engine 412 as language-compliant and can thus be selected as localized content 430.

However, if step 510 indicates one or more flagged components, then the translation language, component (UI feature) and text is flagged in step 514 and provided to a natural language processing (NLP) module 520 to select text in the translated language that can be used in place of the original translated text. As is known, for example, NLP includes computer science fields of study that focus on artificial intelligence (AI)/machine learning (ML) algorithms that process and analyze natural language data. Module 520 depicts just one example of an NLP processing pipeline that includes sentence segmentation 521, tokenization 522, lemmatization 523, stop words filtering 524, part of speech tagging 525 and name entity recognition 526. Each of these processes are known to those of ordinary skill in the art and thus will only be summarily described. Sentence segmentation 521 finds the sentence boundaries (e.g., periods or other punctuation marks) for a set of input text. Tokenization 522 breaks up the sentences into tokens (e.g., words, punctuation marks, etc.). Lemmatization 523 removes inflectional endings and returns the base dictionary form of a word (known as a "lemma"). Stop word filtering 524 identifies words that are considered common words, function words, very short words, etc. in a given language and removes/excludes them from the given text so that greater focus is given to those words which define the meaning of the text. Part of speech tagging 525 determines the part of speech (e.g., noun, verb, etc.) for each word. Name entity recognition 526 determines which words are proper names, such as people or places, and what the type of each such name is (e.g., person, location, organization, etc.).

From the NLP processing pipeline of steps 521 through 526, step 527 selects optimal text that eliminates and/or minimizes any truncation/misalignment issue that led to the component being flagged. Once the alternative text is selected via NLP module 520, steps 506 through 514 are repeated, and the component/text with wireframe will now be language-compliant. However, if there are any remaining flagged component/text for a given translated language, they can be processed by NLP module 520 as mentioned above to yield compliant wireframes in each supported language.

Turning now to content design structure adaptation engine 414, engine 414 determines the optimal content design structure (e.g., wireframe) that supports the translated text that requires minimal changes to original design requirements. Thus, while content adaptation engine 412 keeps the original wireframe design constant and finds the optimal text to include in the translated wireframe, engine 414 keeps the text constant and optimally adapts the original wireframe design. More particularly, content adaptation engine 412 finds the best text by recommending changes in the words/sentences in the supported languages by maintaining a constant (unadapted) content design structure, while content design structure adaptation engine 414 finds the best design by recommending changes in the wireframe or arrangements of components while maintaining words/sentences as constant (unadapted) in the supported languages.

More particularly, content design structure adaptation engine 414 first analyzes the scope and boundaries values (see description above in the context of FIG. 5) of the different components in the original wireframe structure. Engine 416 converts the original text/sentences (content 420) into the different supported languages 417 and lists the components where the converted text is out of scope/inconsistent, e.g., has truncation/misalignment issues. For all such components, engine 416 determines the optimal dimension (e.g., maximum length) that is needed by the truncated/misaligned text, and adapts the wireframe by changing the dimension accordingly, i.e., to properly accommodate the translated text. In some cases, some dimensions may proportionally decrease from adjacent components, and supported languages can be re-checked on the adjacent components that are downsized.

Figure 6:
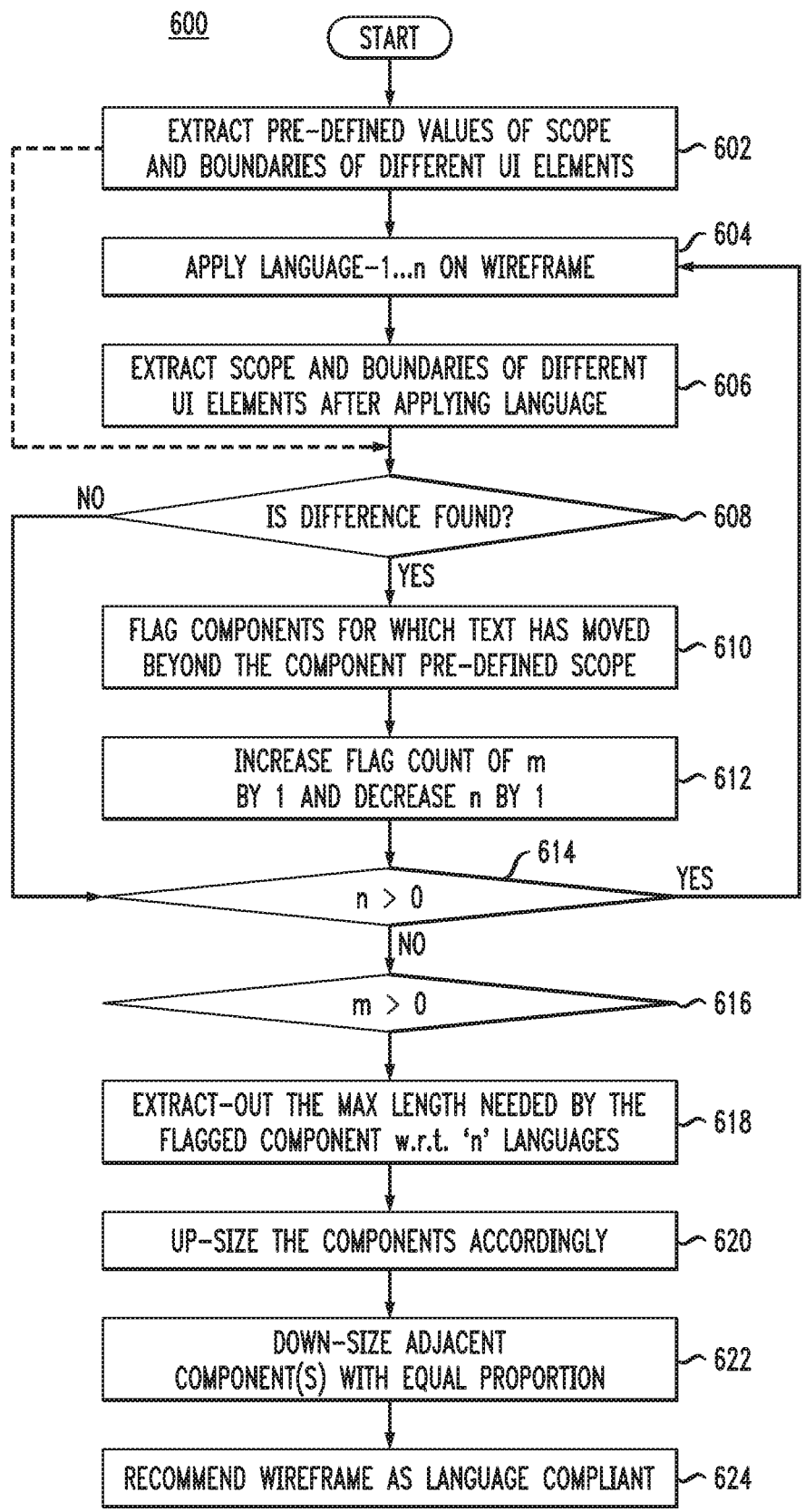
FIG. 6 depicts a content design structure adaptation methodology for content presentation localization, according to an illustrative embodiment.

More particularly, FIG. 6 depicts an illustrative embodiment of a methodology 600 executed by content design structure adaptation engine 414. As shown in methodology 600, step 602 extracts pre-defined values of scope and boundaries of different UI elements of a given original wireframe design. As mentioned above, examples of such scope and boundaries may include, but are not limited to, width and length dimensions of a text box in the original wireframe, width and length dimensions of a drop-down menu, etc. Again, these values are part of the requirements 422 input to system 410 (see FIG. 4). Step 604 applies each of the one or more supported languages (1 . . . n) on the wireframe. For example, the content design structure adaptation engine 414 translates the original content in the source language using machine translation to each of the one or more supported languages. Note that step 614 iterates the translation process for each supported language using the variable n. Step 606 then extracts values of scope and boundaries of different UI elements after applying the given supporting language.

Step 608 checks whether any difference is found between the scope and boundary values of the original wireframe for the source content as compared with the translated content. If yes, step 610 then flags (e.g., marks or otherwise identifies) each component (UI feature) for which text has moved beyond the component predefined dimensions (e.g., a truncation/misalignment issue following translation). Step 612 increases variable m (flag count) by 1 and decreases n by 1. If n is greater than 1 in step 614, meaning that there are still one or more remaining supported languages to be applied, then steps 604 through 612 are repeated for each remaining supporting language. Step 616 tracks the flag count m. Thus, flag count m tracks the number of out of scope components following translation of content into each of the supported languages. Step 618 determines (e.g., extracts out) the maximum length needed for a given flagged component with respect to each of the languages. Step 620 upsizes the flagged component to the maximum length needed to accommodate all the translations, while step 622 downsizes any adjacent components as needed with equal proportion. Once the original wireframe is adapted for each translation, in step 624, each adapted wireframe with translated content is considered language-compliant.

Turning now to image analysis-based adaptation engine 416, engine 416 is configured to find the optimal text (by recommending changes in the sentence/words) in all supported languages for a constant wireframe design. While engine 416 can function as a standalone adaptation feature for localization of a content presentation, in some embodiments, image analysis in engine 416 can be used as a supplemental way to compare (iteratively or otherwise) wireframes with translated content against the original wireframe designs after results from engine 412 and/or engine 414 without human intervention. In some embodiments, the image analysis can employ artificial intelligence (AI)/machine language (ML) algorithms to do the comparisons.

Figure 7:
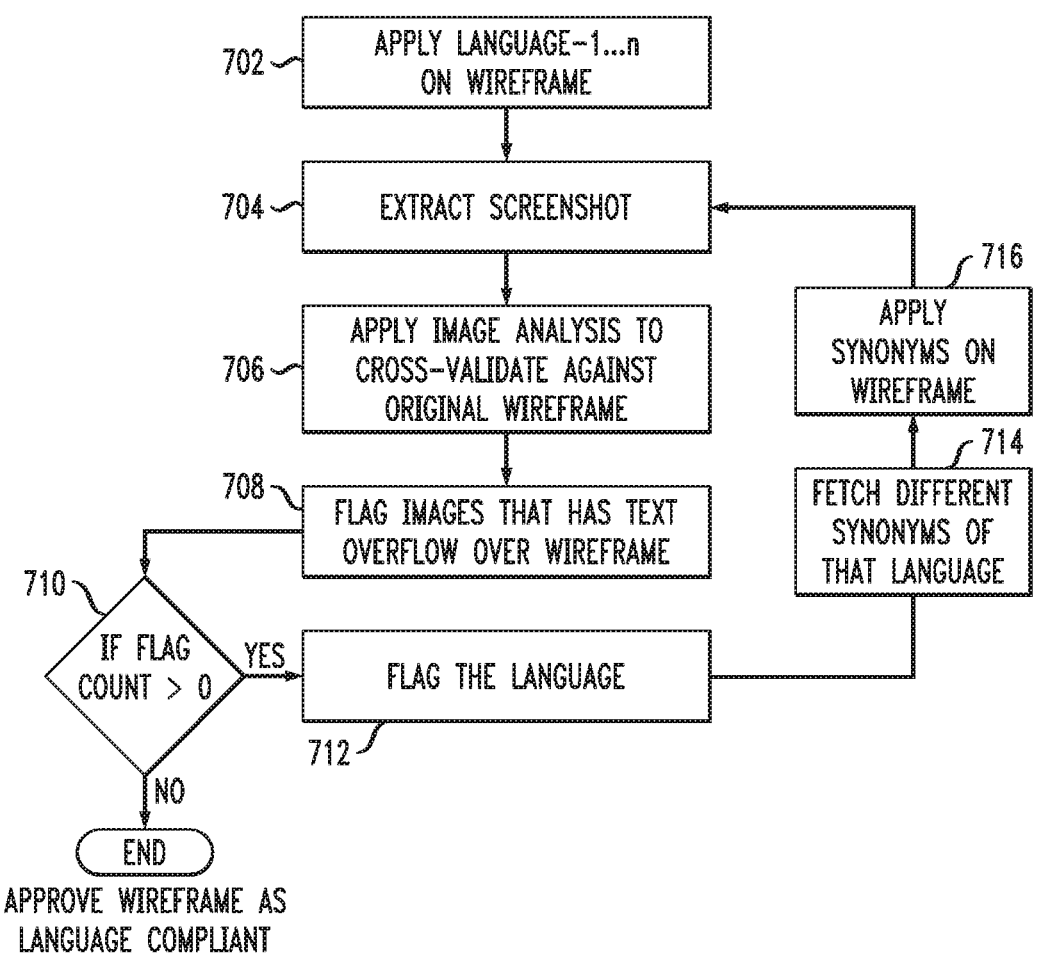
FIG. 7 depicts an image analysis-based adaptation methodology for content presentation localization, according to an illustrative embodiment.

More particularly, FIG. 7 depicts an illustrative embodiment of a methodology 700 executed by image analysis-based adaptation engine 416. As shown in methodology 700, step 702 applies each of the one or more supported languages (1 . . . n) on the original wireframe. For example, engine 416 translates the original content in the source language using machine translation to each of the one or more supported languages. In step 704, a snapshot (image) of each wireframe with translated content is taken (e.g., a web page screenshot is extracted) and each image is compared with a snapshot of the original wireframe with content (previously captured or captured in step 704). Using image recognition (e.g., computer vision algorithm, visual object comparison), step 706 cross-validates the wireframes with translated content against the original wireframe with content. In step 708, engine 416 finds the diversion in corresponding UI elements between the original wireframe and each translation wireframe. For example, step 708 flags any images where translated text overflows the original wireframe dimensions. Step 710 maintains a flag count and for each flagged image, and the language of the translated content is flagged in step 712. Step 714 identifies and fetches a synonym (or text with like meaning) of the overflowing text in the translated language that does not present truncation/misalignment issues. Step 716 then applies the synonym to the wireframe, i.e., the initially-translated text is replaced with its synonym in that particular translation language. Additionally or alternatively, once the image of the translated content is flagged, the wireframe as opposed to the content can be modified as explained above in the context of FIG. 6.

Furthermore, one or more of engines 412, 414 and 416 can use a bag-of-words representation to process the content during engine operations. The term "bag-of-words" or "bag-of-words model" illustratively refers to a simplified representation of a given electronic text (e.g., article, paper, etc.) used in natural language processing and/or information retrieval. In a bag-of-words model, a text is represented as a "bag" of its individual words, disregarding grammar and word order, and the model measures and indicates word multiplicity (i.e., a measure of the occurrence of words in the text).

While content localization is described above in illustrative embodiments with respect to text, it is to be appreciated that alternative embodiments can adapt images, designs and other features of a website, all while maintaining the integrity of the website.

Figure 8:
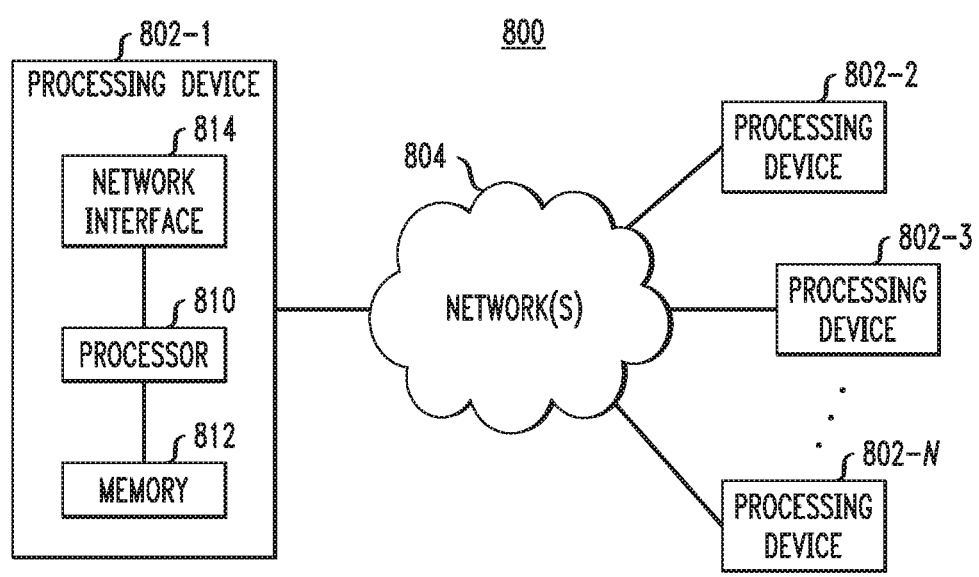
FIG. 8 depicts a processing platform used to implement an information processing system with content presentation localization, according to an illustrative embodiment.

FIG. 8 depicts a processing platform 800 used to implement an information processing system configured to provide localization of a content presentation, according to an illustrative embodiment. More particularly, processing platform 800 is a processing platform on which a computing environment with functionalities described herein (e.g., FIGS. 1-7 and otherwise described herein) can be implemented.

The processing platform 800 in this embodiment comprises a plurality of processing devices, denoted 802-1, 802-2, 802-3, . . . 802-N, which communicate with one another over network(s) 804. It is to be appreciated that the methodologies described herein may be executed in one such processing device 802, or executed in a distributed manner across two or more such processing devices 802. It is to be further appreciated that a server, a client device, a computing device or any other processing platform element may be viewed as an example of what is more generally referred to herein as a "processing device." As illustrated in FIG. 8, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 802 shown in FIG. 8. The network(s) 804 represent one or more communications networks that enable components to communicate and to transfer data therebetween, as well as to perform other functionalities described herein.

The processing device 802-1 in the processing platform 800 comprises a processor 810 coupled to a memory 812. The processor 810 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 810. Memory 812 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 812 may comprise electronic memory such as random-access memory (RAM), read-only memory (ROM) or other types of memory, in any combination. The one or more software programs when executed by a processing device such as the processing device 802-1 causes the device to perform functions associated with one or more of the components/steps of system/methodologies in FIGS. 1-7. One skilled in the art would be readily able to implement such software given the teachings provided herein. Other examples of processor-readable storage media embodying embodiments of the invention may include, for example, optical or magnetic disks.

Processing device 802-1 also includes network interface circuitry 814, which is used to interface the device with the networks 804 and other system components. Such circuitry may comprise conventional transceivers of a type well known in the art.

The other processing devices 802 (802-2, 802-3, . . . 802-N) of the processing platform 800 are assumed to be configured in a manner similar to that shown for computing device 802-1 in the figure.

The processing platform 800 shown in FIG. 8 may comprise additional known components such as batch processing systems, parallel processing systems, physical machines, virtual machines, virtual switches, storage volumes, etc. Again, the particular processing platform shown in this figure is presented by way of example only, and the system shown as 800 in FIG. 8 may include additional or alternative processing platforms, as well as numerous distinct processing platforms in any combination.

Also, numerous other arrangements of servers, clients, computers, storage devices or other components are possible in processing platform 800. Such components can communicate with other elements of the processing platform 800 over any type of network, such as a wide area network (WAN), a local area network (LAN), a satellite network, a telephone or cable network, or various portions or combinations of these and other types of networks.

Furthermore, it is to be appreciated that the processing platform 800 of FIG. 8 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 800 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers. As illustratively used herein, a container is considered a "virtual computing element" (e.g., unit of software) that packages application code and its dependencies so that the application is executed quickly and reliably from one computing environment to another. A Docker container image is a lightweight, standalone, executable package of software that includes all components needed to execute an application.

The particular processing operations and other system functionality described in conjunction with FIGS. 1-8 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A system, comprising:
at least one processing device comprising a processor operatively coupled to a memory, wherein the at least one processing device, for a given content presentation, is configured to:
obtain source content in a source language and a first content design structure that is consistent with the source content;
translate the source content to translated content, the translated content being in at least one destination language and associated with a second content design structure that is consistent with the translated content;
obtain a first image of the source content and the first content design structure and a second image of the translated content and the second content design structure;
compare the first image and the second image to identify one or more inconsistent portions associated with one or more second image portions of the second image relative to one or more corresponding first image portions of the first image; and adapt the one or more inconsistent portions of at least the translated content of the second image to generate one or more adapted portions of translated content that are consistent with the first content design structure such that the given content presentation is localized for the at least one destination language.

2. The system of claim 1, wherein identifying one or more inconsistent portions further comprises determining that one or more portions of the translated content are out of scope with respect to the first content design structure.

3. The system of claim 2, wherein a portion of translated content is out of scope when the portion of translated content is one of truncated and misaligned in the first content design structure as compared with the corresponding portion of source language content.

4. The system of claim 1, wherein adapting one or more inconsistent portions of translated content to generate one or more adapted portions of translated content that are consistent with the first content design structure further comprises obtaining one or more portions of alternative translated content that have a same or similar meaning to the one or more inconsistent portions of translated content and that are consistent with one or more dimensions associated with corresponding components of the first content design structure.

5. The system of claim 1, wherein comparing the first image and the second image to identify one or more inconsistent portions of the translated content further comprises applying an artificial intelligence-based image analysis algorithm to the first image and the second image.

6. The system of claim 1, wherein the given content presentation localized for the at least one destination language is at least one web page.

7. The system of claim 1, wherein the source content in the source language comprises one or more of text, an image and a design element.

8. The system of claim 1 wherein comparing the first image and the second image to identify one or more inconsistent portions includes identifying one or more diversions in corresponding components of the first content design structure and the second content design structure.

9. A method, comprising:
obtaining, for a given content presentation, source content in a source language and a first content design structure that is consistent with the source content;
translating the source content to translated content, the translated content being in at least one destination language and associated with a second content design structure that is consistent with the translated content;
obtaining a first image of the source content and the first content design structure and a second image of the translated content and the second content design structure;
comparing the first image and the second image to identify one or more inconsistent portions associated with one or more second image portions of the second image relative to one or more corresponding first image portions of the first image; and
adapting the one or more inconsistent portions of at least the translated content of the second image to generate one or more adapted portions of translated content that are consistent with the first content design structure such that the given content presentation is localized for the at least one destination language;

wherein the steps are performed by at least one processing device comprising a processor operatively coupled to a memory.

10. The method of claim 9, wherein identifying one or more inconsistent portions further comprises determining that one or more portions of the translated content are out of scope with respect to the first content design structure.

11. The method of claim 10, wherein a portion of translated content is out of scope when the portion of translated content is one of truncated and misaligned in the first content design structure as compared with the corresponding portion of source language content.

12. The method of claim 9, wherein adapting one or more inconsistent portions of translated content to generate one or more adapted portions of translated content that are consistent with the first content design structure further comprises obtaining one or more portions of alternative translated content that have a same or similar meaning to the one or more inconsistent portions of translated content and that are consistent with one or more dimensions associated with corresponding components of the first content design structure.

13. The method of claim 9, wherein comparing the first image and the second image to identify one or more inconsistent portions of the translated content further comprises applying an artificial intelligence-based image analysis algorithm to the first image and the second image.

14. The method of claim 9, wherein the given content presentation localized for the at least one destination language is at least one web page.

15. The method of claim 9, wherein the source content in the source language comprises one or more of text, an image and a design element.

16. An article of manufacture comprising a non-transitory processor-readable storage medium having stored therein program code of one or more software programs, wherein the program code when executed by at least one processing device causes said at least one processing device to perform steps of:
obtaining, for a given content presentation, source content in a source language and a first content design structure that is consistent with the source content;
translating the source content to translated content, the translated content being in at least one destination language and associated with a second content design structure that is consistent with the translated content;
obtaining a first image of the source content and the first content design structure and a second image of the translated content and the second content design structure;
comparing the first image and the second image to identify one or more inconsistent portions associated with one or more second image portions of the second image relative to one or more corresponding first image portions of the first image; and
adapting the one or more inconsistent portions of at least the translated content of the second image to generate one or more adapted portions of translated content that are consistent with the first content design structure such that the given content presentation is localized for the at least one destination language.

17. The article of claim 16, wherein identifying one or more inconsistent portions further comprises determining that one or more portions of the translated content are out of scope with respect to the first content design structure.

18. The article of claim 17, wherein a portion of translated content is out of scope when the portion of translated content is one of truncated and misaligned in the first content design structure as compared with the corresponding portion of source language content.

19. The article of claim 16, wherein adapting one or more inconsistent portions of translated content to generate one or more adapted portions of translated content that are consistent with the first content design structure further comprises obtaining one or more portions of alternative translated content that have a same or similar meaning to the one or more inconsistent portions of translated content and that are consistent with one or more dimensions associated with corresponding components of the first content design structure.

20. The article of claim 16, wherein comparing the first image and the second image to identify one or more inconsistent portions of the translated content further comprises applying an artificial intelligence-based image analysis algorithm to the first image and the second image.

\* \* \* \* \*